(12) United States Patent
Fuse

(10) Patent No.: US 11,611,677 B2
(45) Date of Patent: Mar. 21, 2023

(54) INFORMATION PROCESSING APPARATUS THAT IDENTIFIES RELATED DOCUMENT IMAGES BASED ON METADATA AND ASSOCIATES THEM BASED ON USER INPUT, INFORMATION PROCESSING SYSTEM, INFORMATION PROCESSING METHOD, AND STORAGE MEDIUM

(71) Applicant: Canon Kabushiki Kaisha, Tokyo (JP)

(72) Inventor: Hiroshi Fuse, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/124,980

(22) Filed: Dec. 17, 2020

(65) Prior Publication Data

US 2021/0203805 A1    Jul. 1, 2021

(30) Foreign Application Priority Data

Dec. 25, 2019 (JP) .............................. JP2019-234350

(51) Int. Cl.
  *H04N 1/387* (2006.01)
  *H04N 1/00* (2006.01)
  *H04N 1/32* (2006.01)
  *H04N 1/34* (2006.01)

(52) U.S. Cl.
  CPC ....... *H04N 1/3871* (2013.01); *H04N 1/00442* (2013.01); *H04N 1/32101* (2013.01); *H04N 1/32128* (2013.01); *H04N 1/34* (2013.01); *H04N 2201/0094* (2013.01)

(58) Field of Classification Search
  None
  See application file for complete search history.

(56) References Cited

U.S. PATENT DOCUMENTS

| | | |
|---|---|---|
| 2005/0251748 A1* | 11/2005 | Gusmorino .......... G06F 3/0481 715/713 |
| 2006/0004728 A1* | 1/2006 | Gotoh .................... G06F 16/58 707/E17.02 |
| 2009/0019074 A1* | 1/2009 | Hino ....................... G06F 16/56 |
| 2018/0205851 A1* | 7/2018 | Hattori ................. H04N 1/4426 |
| 2018/0288355 A1* | 10/2018 | Minami ................. G06T 3/4038 |
| 2019/0129969 A1* | 5/2019 | Martin .................... G06F 16/58 |
| 2020/0382661 A1* | 12/2020 | Ito ........................ H04N 1/00005 |

FOREIGN PATENT DOCUMENTS

JP          2006330863 A    12/2006

* cited by examiner

*Primary Examiner* — Miya J Williams
(74) *Attorney, Agent, or Firm* — Venable LLP

(57) ABSTRACT

An apparatus compares pieces of document image data with each other based on the result of a multi-cropping process and the result of an analysis of the document images and, if the pieces of document image data have the same date information and money amount information, determines that related pieces of data are present. In this way, the apparatus can easily prevent pieces of information related to the same transaction from redundantly registered in a system.

11 Claims, 18 Drawing Sheets

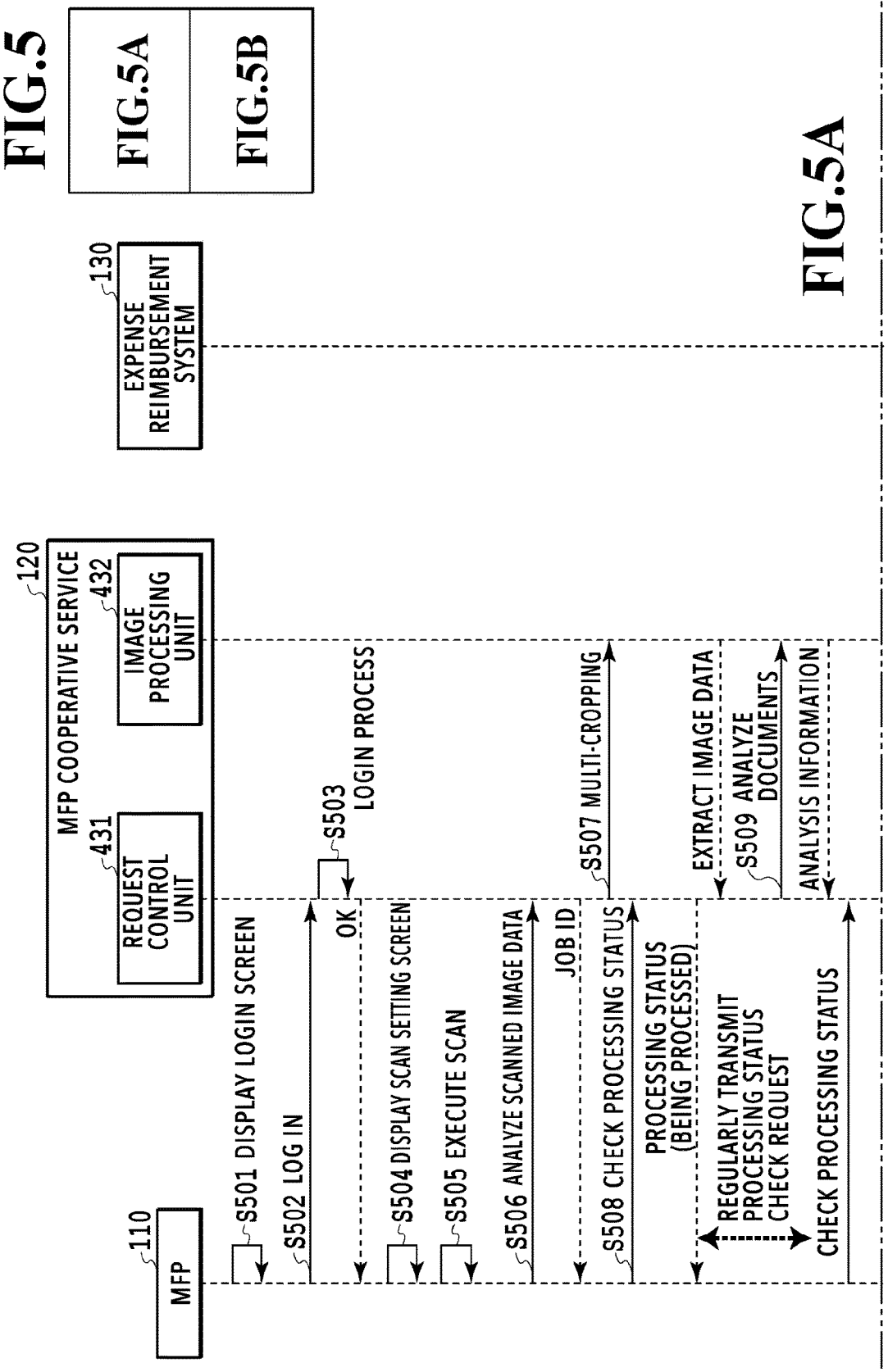

METADATA SETTINGS ~1000

RECEIPT

CAR NUMBER: 1234
MARCH 11, 2018
AMOUNT OF MONEY
¥2,000

THANK YOU FOR USING US

○○ TAXI CORPORATION
TEL : 000-000-0000

~1008

EXPENSE TYPE: Taxi ▼ ~1004
TRANSACTION DATE: 2018/3/11 ~1005
AMOUNT OF MONEY: 2000 ~1006
LOCATION: TOKYO ~1007

1003 | 1002 | 1001
BACK | NEXT | TRANSMIT

FIG.10

```
{
  "JobID": "12345678"
}
```

FIG.11

```
{
    "Status": "processing"
}
```

FIG.12A

```
{
    "Status" : "completed",
    "Images" : [
        {
                "ImageID" : "image0001",
                "ContentsType" : "Receipt",
                "ReceiptData" : [
                        {
                                "Date" : "20180313",
                                "Amount" : "10000"
                        }
                ],
                "Points" : [2049, 361, 4665, 241, 4793, 1345, 2169, 1465]
        },
        {
                "ImageID" : "image0002",
                "ContentsType" : "Receipt",
                "ReceiptData" : [
                        {
                                "Date" : "20180311",
                                "Amount" : "2000"
                        }
                ],
                "Points" : [2921, 1825, 3977, 1897, 3857, 3353, 2825, 3265]
        },
        {
                "ImageID" : "image0003",
                "ContentsType" : "CustomerCopy",
                "ReceiptData" : [
                        {
                                "Date" : "20180313",
                                "Amount" : "10000"
                        }
                ],
                "Points" : [777, 337, 1721, 329, 1711, 2057, 769, 2049]
        }
    ]
}
```

FIG.12B

```
{
   "ExpenseTypes": [
      {
         "ID": "0001",
         "Name": "Hotel"
      },
      {
         "ID": "0002",
         "Name": "Car Rental"
      },
      {
         "ID": "0003",
         "Name": "Fuel"
      },
      {
         "ID": "0004",
         "Name": "Parking"
      },
      {
         "ID": "0005",
         "Name": "Taxi"
      },
      {
         "ID": "0007",
         "Name": "Breakfast"
      },
      {
         "ID": "0008",
         "Name": "Lunch"
      },
      {
         "ID": "0009",
         "Name": "Dinner"
      },
      {
         "ID": "0010",
         "Name": "Business Meals"
      }
   ]
}
```

FIG.13

```
{
    "ExpenseTypeID": "0005",
    "TransactionDate": "20180311",
    "Amount": "2000",
    "Location": "Tokyo"
}
```

FIG.14

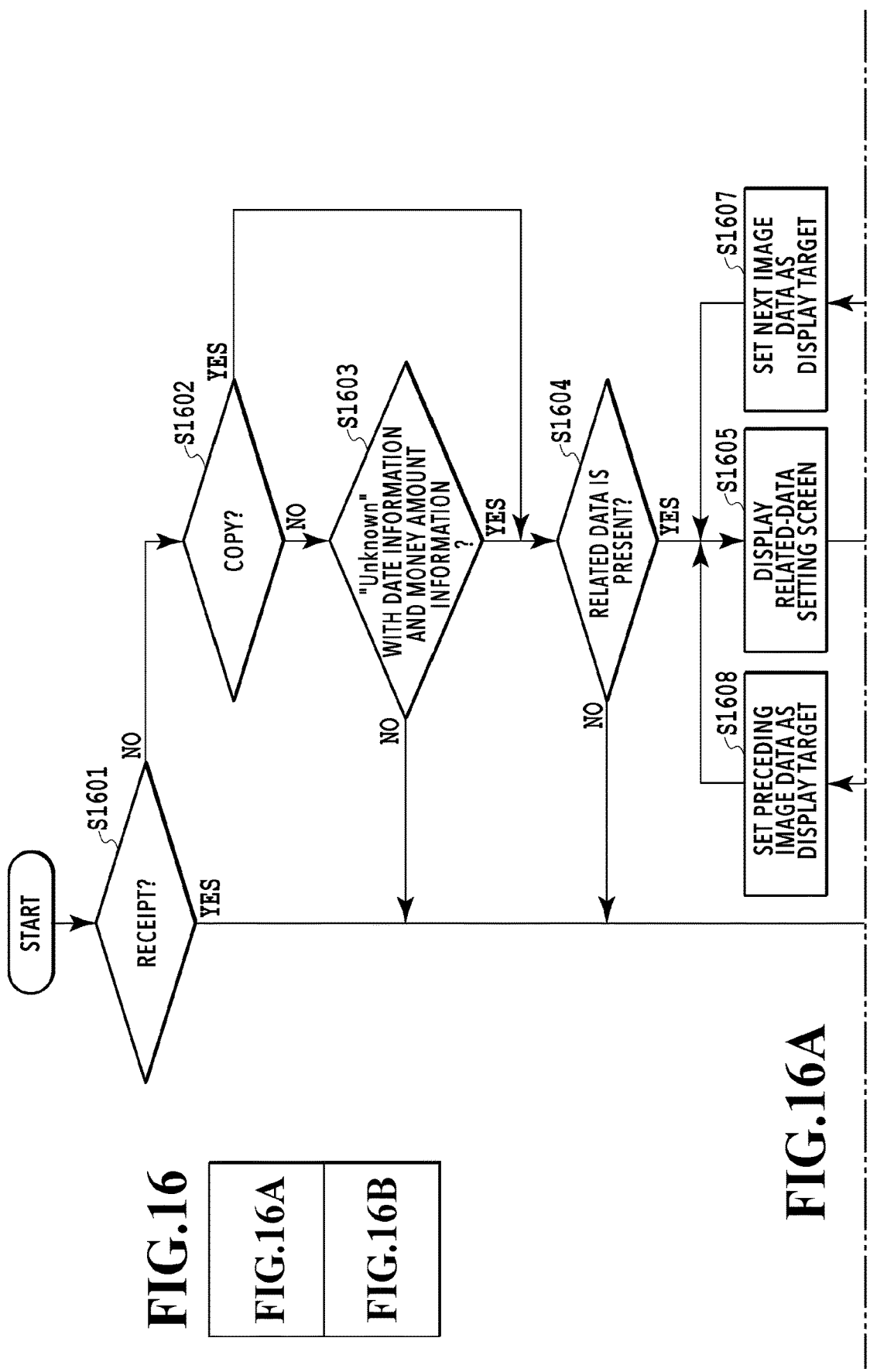

INFORMATION PROCESSING APPARATUS THAT IDENTIFIES RELATED DOCUMENT IMAGES BASED ON METADATA AND ASSOCIATES THEM BASED ON USER INPUT, INFORMATION PROCESSING SYSTEM, INFORMATION PROCESSING METHOD, AND STORAGE MEDIUM

BACKGROUND

Field

The present disclosure relates to a technique for extracting related pieces of image data.

Description of the Related Art

There are systems that registers each of images obtained by scanning receipts or the like with a scanner apparatus as an individual expense reimbursement target and settles the expense. Many of such expense reimbursement systems are designed such that receipts already registered before cannot be registered again. For example, Japanese Patent Laid-Open No. 2006-330863 discloses a method in which whether a scanned image has already been registered in a system is determined and, if the scanned image has already been registered, it is assumed that the same document is scanned again, and the duplicate scanned image is not registered into the system.

There is also a multi-cropping process in which a plurality of documents such as receipts are placed side by side on a manuscript table glass of a scanner apparatus, a document detection process is performed on the scanned image, and an image of each individual detected document is cropped out of the scanned image. One may consider combining such a multi-cropping process and expense reimbursement system to register images of receipts or the like cropped out by the multi-cropping process into the expense reimbursement system. This makes it easier to process a plurality of expense reimbursements later at once.

However, as the number of documents increases, the user sometimes scans documents together that have partly different descriptions and/or have different sizes but are related to the same transaction, such as a "receipt" and a "customer copy of credit card payment", and performs the multi-cropping process on them. The method of Japanese Patent Laid-Open No. 2006-330863 has a function of comparing a piece of document image data with those scanned before to determine whether the same piece of document image data is present, but does not have a function of determining whether pieces of document image data are different pieces of image data but are related to the same transaction. Thus, a problem with the technique of Japanese Patent Laid-Open No. 2006-330863 is that pieces of document image data of documents that are related to the same transaction but have partly different descriptions and/or have different sizes are handled as different pieces of document image data and pieces of data on the same transaction are redundantly registered.

SUMMARY

The present disclosure is an information processing apparatus including:
a memory that stores an instruction; and
a processor that executes the instruction to perform:
obtaining a plurality of pieces of document image data corresponding respectively to a plurality of documents detected from scanned image data obtained by scanning the plurality of documents;
obtaining pieces of metadata extracted respectively from the plurality of pieces of document image data; and
identifying two or more related pieces of document image data assumed to be related to a same transaction among the plurality of pieces of document image data based on the obtained pieces of metadata.

Further features of the present disclosure will become apparent from the following description of exemplary embodiments with reference to the attached drawings.

BRIEF DESCRIPTION I/F THE DRAWINGS

FIG. 5 is a diagram representing a relationship between FIGS. 5A and 5B;

FIGS. 5A and 5B are a sequence chart illustrating communication in processing between apparatuses according to the embodiment;

FIG. 10 is a diagram illustrating a metadata setting screen on the MFP according to the embodiment;

FIG. 11 is a diagram illustrating response data for a metadata obtaining request according to the embodiment;

FIG. 12A is a diagram illustrating response data for a processing status check request according to the embodiment;

FIG. 12B is a diagram illustrating response data for a processing status check request according to the embodiment;

FIG. 13 is a diagram illustrating response data for a scanned image analysis request according to the embodiment;

FIG. 14 is a diagram illustrating request data in a metadata setting request according to the embodiment;

FIG. 16 is a diagram representing a relationship between FIGS. 16A and 16B; and FIGS. 16A and 16B are a flowchart illustrating the expense reimbursement process by the MFP according to the embodiment.

DESCRIPTION OF THE EMBODIMENTS

An embodiment of the present disclosure will be described below with reference to the drawings. Note that the following embodiment does not limit the present disclosure according to the claims, and not all the combinations of the features described in the embodiment are necessarily essential for the solution provided by the present disclosure.
[System Configuration]

Figure 1:
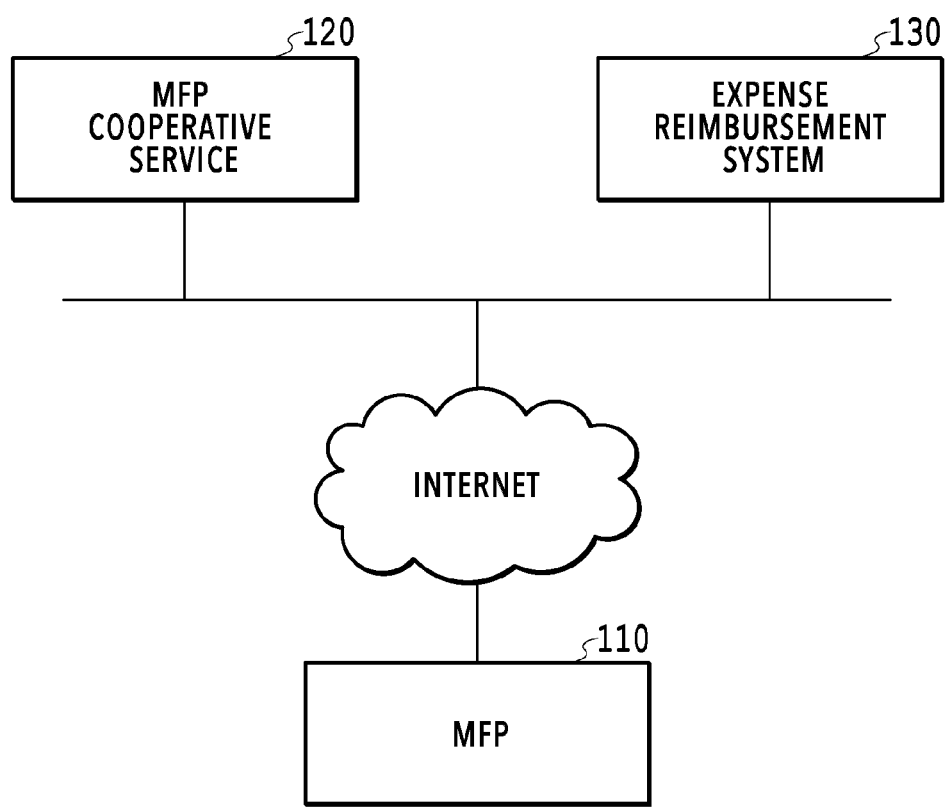
FIG. 1 is a diagram of an entire system according to an embodiment.

FIG. 1 is a diagram illustrating an entire configuration of an information processing system according to the embodiment. The information processing system includes an MFP 110, an MFP cooperative service 120, and an expense reimbursement system 130. The MFP 110 is communicatively connected to a server that provides various services through a local area network (LAN) and the Internet.

The MFP 110 is a multifunction peripheral having a plurality of functions such as those of a scanner and a printer, and represents an example of an information processing apparatus.

The MFP cooperative service 120 represents an example of a service having functions such as storing image files obtained by scanning with the MFP 110 in the service's server and transferring the image files to a service capable of storing files in other storage services or the like.

The expense reimbursement system 130 represents a service that provides functions for a company to efficiently reimburse expenses. It is capable of, for example, storing and managing scanned receipt images and metadata being additional information on the receipts, and setting proxy applicants being persons who scans receipts on behalf of the actual persons involved.

The information processing system in the embodiment is configured of the MFP 110 and the MFP cooperative service 120, but is not limited to this configuration. For example, the MFP 110 may also serve as the MFP cooperative service 120. Also, the connection form of the MFP cooperative service 120 may be such that its server is installed on a LAN, not on the Internet (i.e., on-premises).
[Hardware Configuration of MFP]

Figure 2:
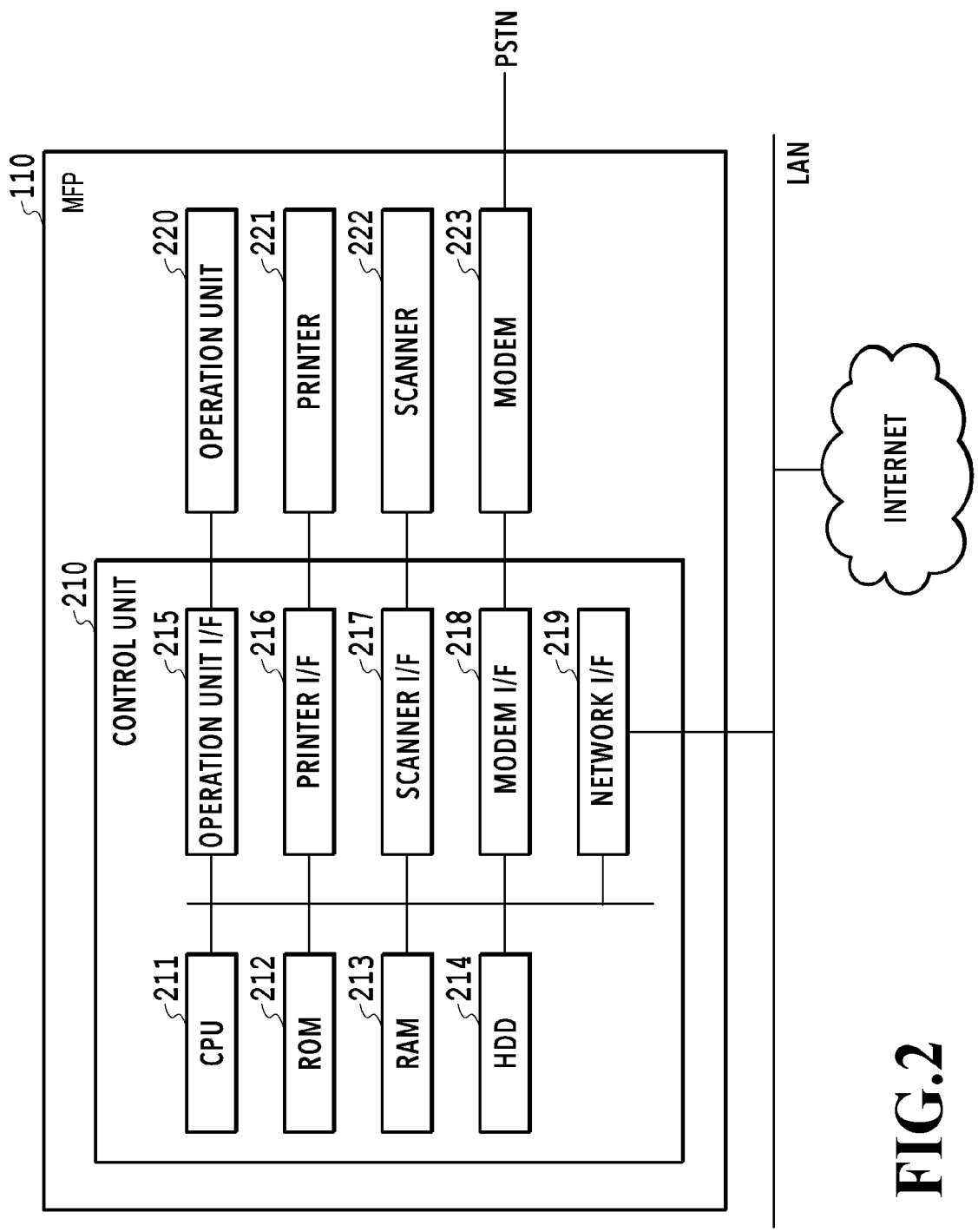
FIG. 2 is a hardware configuration diagram of a multi-function peripheral (MFP) according to the embodiment.

FIG. 2 is a hardware configuration diagram of the MFP 110. The MFP 110 is configured of a control unit 210, an operation unit 220, a printer unit 221, a scanner unit 222, and a modem 223.

The control unit 210 is configured of the following components 211 to 219, and controls the entire operation of the MFP 110. The CPU 211 reads out a control program stored in the ROM 212, and executes and controls various functions of the MFP 110 such as reading, printing, and communication. The RAM 213 is used as temporary storage areas such as a main memory and a work area for the CPU 211. Note that in the embodiment, a single CPU 211 executes the processes illustrated in the later-described flowcharts by using a single memory (RAM 213 or HDD 214), but the present disclosure is not limited to this case. For example, a plurality of CPUs and a plurality of RAMs or HDDs may be caused to cooperate with each other to execute the processes. The HDD 214 is a large-capacity storage unit that stores image data and various programs.

The operation unit I/F 215 is an interface that connects the operation unit 220 and the control unit 210. The operation unit 220 includes a liquid crystal display unit having a touchscreen function, a keyboard, and the like, and receives user operations, inputs, and instructions. Note that the liquid crystal display unit is capable of displaying scanned images and various setting screens.

The printer I/F 216 is an interface that connects the printer unit 221 and the control unit 210. Image data to be printed is transferred from the control unit 210 to the printer unit 221 via the printer I/F 216, and printed onto a print medium.

The scanner I/F 217 is an interface that connects the scanner unit 222 and the control unit 210. The scanner unit 222 generates image data by reading a document set on manuscript table glass or auto document feeder (ADF) not illustrated, and inputs the image data to the control unit 210 via the scanner I/F 217. The MFP 110 is capable of transmitting or e-mailing the image data generated by the scanner unit 222 as a file, as well as outputting the image data as a print output (copying the image data) from the printer unit 221.

The modem I/F 218 is an interface that connects the modem 223 and the control unit 210. The modem 223 performs facsimile communication of image data with a facsimile on a PSTN.

The network I/F 219 is an interface that connects the control unit 210 (MFP 110) to a LAN. The MFP 110 connects to the LAN by using the network I/F 219 and, for example, transmits image data and information to and receives various pieces of information from services on the Internet via a router installed on the LAN.
[Hardware Configuration of MFP Cooperative Service and Expense Reimbursement System]

Figure 3:
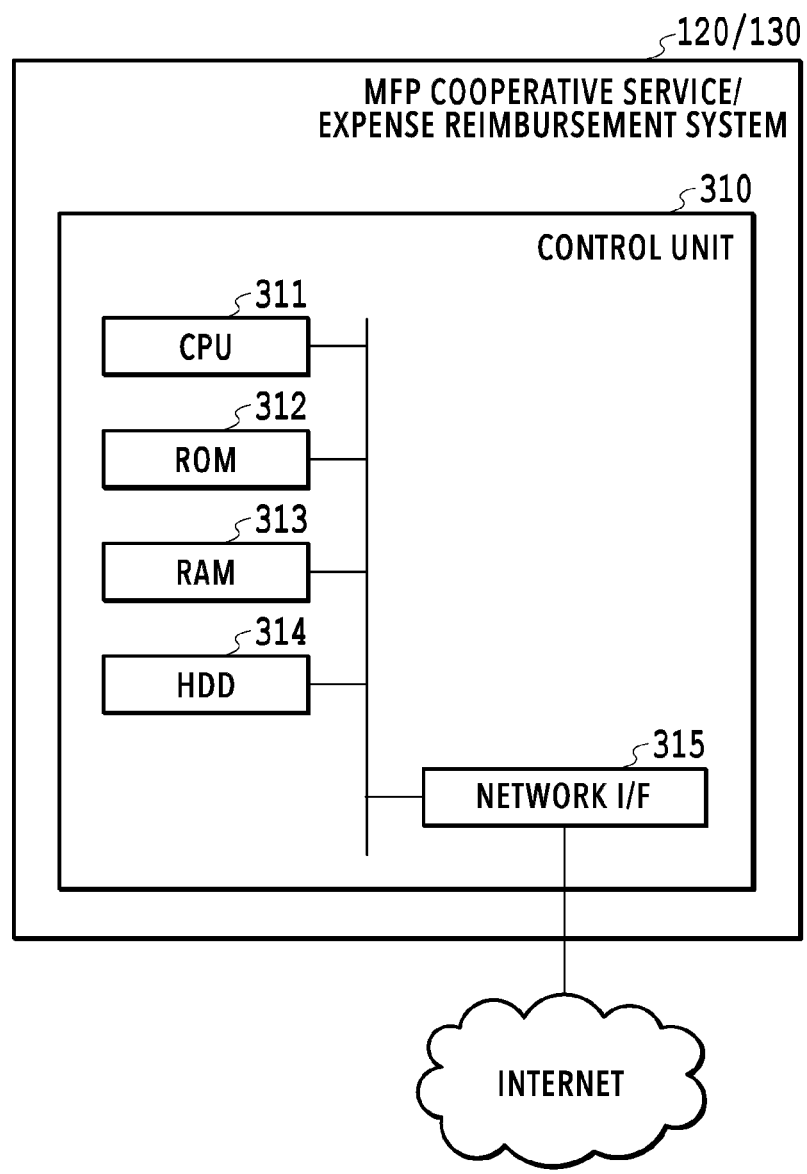
FIG. 3 is a hardware configuration diagram of an MFP cooperative service and an expense reimbursement system according to the embodiment.

FIG. 3 is a hardware configuration diagram of the MFP cooperative service 120 and the expense reimbursement system 130. The MFP cooperative service 120 and the expense reimbursement system 130 have similar hardware configurations.

The MFP cooperative service 120 and the expense reimbursement system 130 are each configured of a CPU 311, a ROM 312, a RAM 313, an HDD 314, and a network I/F 315. The CPU 311 reads out a control program stored in the ROM 312 and executes various processes to control the entire operation. The RAM 313 is used as temporary storage areas such as a main memory and a work area for the CPU 311. The HDD 314 is a large-capacity storage unit that stores image data and various programs. The network I/F 315 is an interface that connects the MFP cooperative service 120 and the expense reimbursement system 130 to the Internet. The MFP cooperative service 120 and the expense reimbursement system 130 transmit and receive various pieces of information to and from other apparatuses (such as the MFP 110) through the Internet by using the network I/F 315 in response to receiving processing requests from them.
[Software Configuration of Information Processing System]

Figure 4:
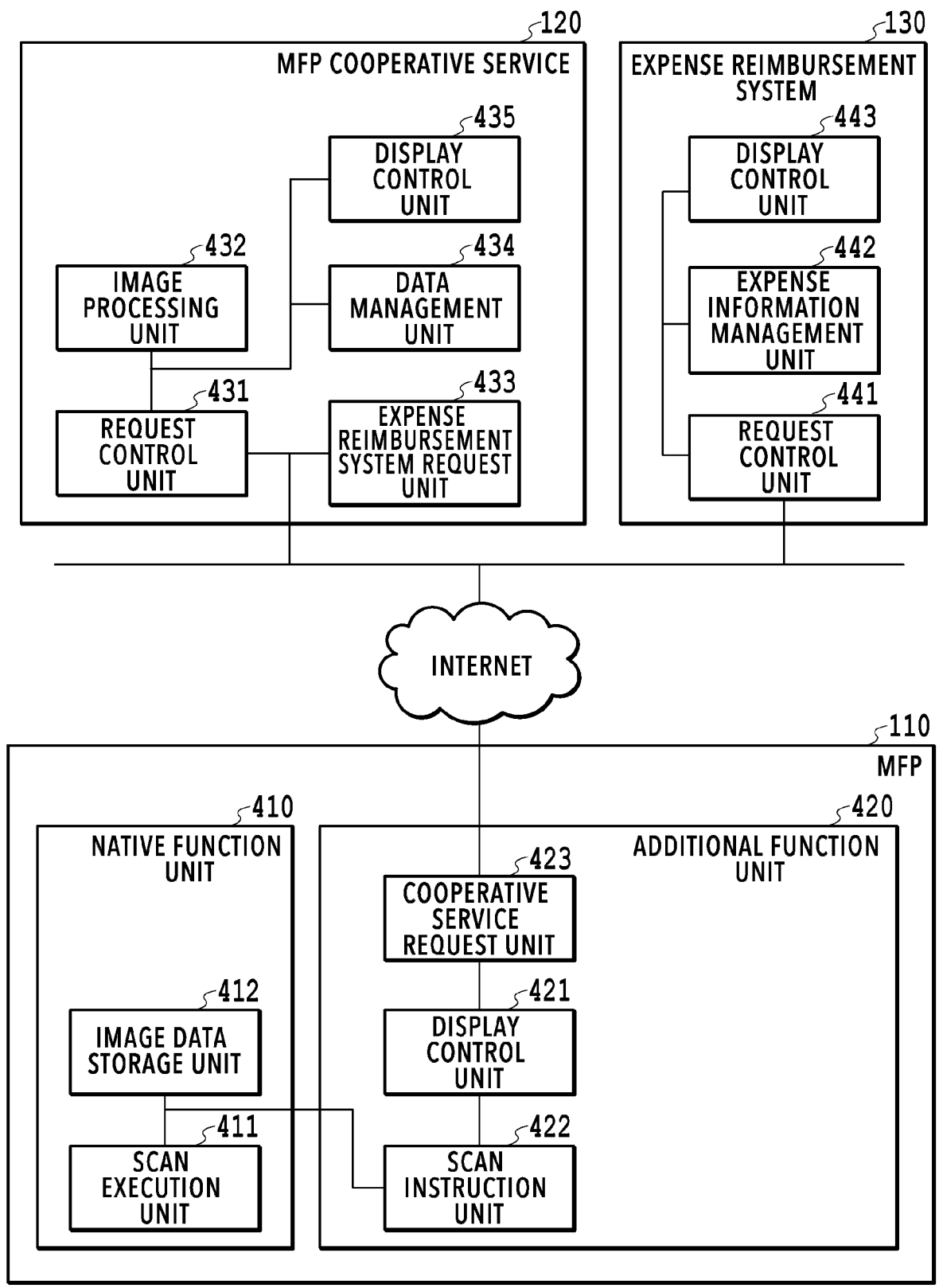
FIG. 4 is a software configuration diagram of the entire system according to the embodiment.

FIG. 4 is a software configuration diagram of the information processing system according to the embodiment. The MFP 110 can be generally divided into a native function unit 410 and an additional function unit 420. The components included in the native function unit 410 are standard components included in the MFP 110, whereas the additional function unit 420 is an application additionally installed in the MFP 110. The additional function unit 420 is a Java (registered trademark)-based application. This enables functions to be easily added to the MFP 110. Note that other additional applications that are not illustrated may be installed in the MFP 110.

The native function unit 410 has a scan execution unit 411 and an image data storage unit 412. The additional function unit 420 has a display control unit 421, a scan instruction unit 422, and a cooperative service request unit 423.

The display control unit 421 displays user interface screens for receiving user operations on the liquid crystal display unit of the operation unit 220 in the MFP 110, which has a touchscreen function. For example, the display control unit 421 displays user interface screens for receiving instructions such as an input of authentication information for accessing the MFP cooperative service 120, scan settings and an operation to start a scan, and an input of metadata. The display control unit 421 also performs preprocessing for controlling the display (such as a related-data determination and an identical-data determination).

The scan instruction unit 422 requests the scan execution unit 411 to perform a scan process with scan settings corresponding to a user instruction inputted via a user interface screen.

The scan execution unit 411 receives the scan request from the scan instruction unit 422 containing the scan settings. The scan execution unit 411 reads documents placed on the manuscript table glass in accordance with the scan request by using the scanner unit 222 via the scanner I/F 217 to thereby generate scanned image data. The generated scanned image data is transferred to the image data storage unit 412. The scan execution unit 411 transfers a scanned image identifier uniquely indicating the stored scanned image data to the scan instruction unit 422. The image data storage unit 412 stores the scanned image data received from the scan execution unit 411 in the HDD 214.

The scan instruction unit 422 obtains the scanned image data corresponding to the scanned image identifier received from the scan execution unit 411 from the image data storage unit 412. The scan instruction unit 422 requests the cooperative service request unit 423 to issue an instruction to perform a multi-cropping process on the obtained scanned image data.

The cooperative service request unit 423 requests the MFP cooperative service 120 to perform various processes. For example, the cooperative service request unit 423 requests the MFP cooperative service 120 to perform a login, perform a multi-cropping process, obtain metadata, set metadata, etc. A protocol such as REST or SOAP is used for the communication with the MFP cooperative service 120, but other communication means may be used.

The MFP cooperative service 120 has a request control unit 431, an image processing unit 432, an expense reimbursement system request unit 433, a data management unit 434, and a display control unit 435.

The request control unit 431 waits in a state in which it can receive a request from an external apparatus. In response to receiving a processing request, the request control unit 431 instructs the image processing unit 432, the expense reimbursement system request unit 433, and the data management unit 434 to perform processing as appropriate in accordance with the request.

The image processing unit 432 performs a multi-cropping process and image analysis processes such as OCR and a layout analysis on the image.

The expense reimbursement system request unit 433 requests the expense reimbursement system 130 to perform various processes. For example, the expense reimbursement system request unit 433 requests the expense reimbursement system 130 to obtain a list of proxy applicants, obtain a list of expense types, register receipt image data, and set metadata corresponding to a receipt image.

The data management unit 434 holds user information, various pieces of setting data, and so on managed in the MFP cooperative service 120.

The display control unit 435 returns screen layout information (such as HTML and CSS) necessary to display a screen in response to receiving a request from a web browser running on another terminal (not illustrated) such as a PC or mobile terminal connected via the Internet. Via the screen displayed on the web browser based on the screen layout information returned from the display control unit 435, the user can, for example, check user information registered in the MFP cooperative service 120 or change the scan settings.

The expense reimbursement system 130 has a request control unit 441, an expense information management unit 442, and a display control unit 443.

The request control unit 441 waits in a state in which it can receive a request from an external apparatus and, in response to receiving a processing request, instructs the expense information management unit 442 to perform processing as appropriate.

The expense information management unit 442 holds expense information registered in the expense reimbursement system 130.

The display control unit 443 returns screen layout information (such as HTML and CSS) necessary to display a screen in response to receiving a request from a web browser running on another terminal (not illustrated) such as a PC or mobile terminal connected via the Internet. Via the screen displayed on the web browser based on the screen layout information returned from the display control unit 443, the user can, for example, check the information of an expense report registered in the expense reimbursement system 130 and expense information containing a receipt image or enter data.

[Entire Flow of Processing]

Figure 5B:
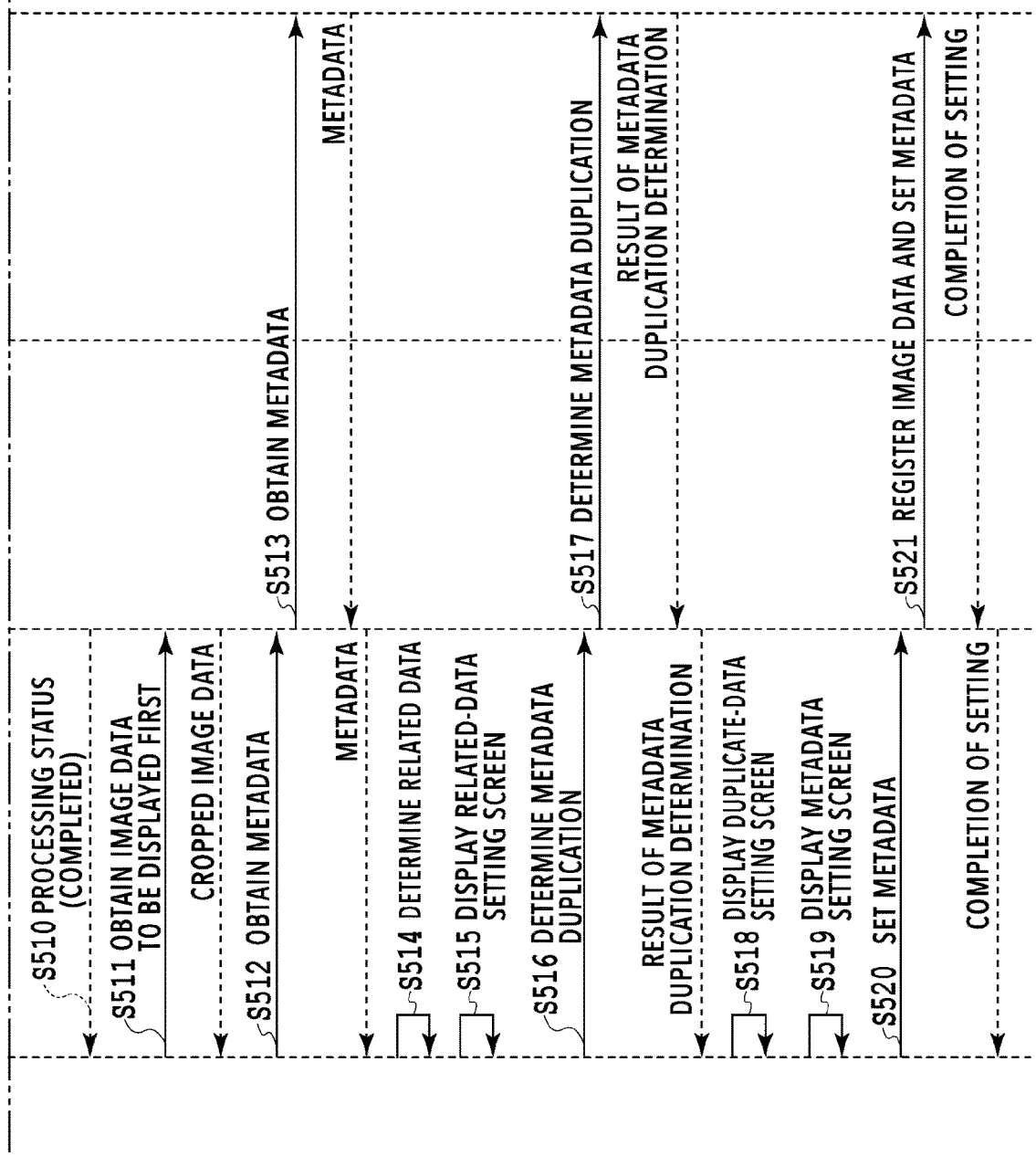

FIG. 5 is a sequence chart illustrating a flow of processing performed between the apparatuses in a case of scanning receipts with the MFP 110 and registering expense information into the expense reimbursement system 130. The following description will focus on communication between the MFP 110, the request control unit 431 and the image processing unit 432 of the MFP cooperative service 120, and the expense reimbursement system 130.

The MFP 110, in a normal state, displays a main screen in which buttons for executing functions to be provided are arranged side by side on the liquid crystal display unit of the operation unit 220, which has a touchscreen function.

Figure 6:
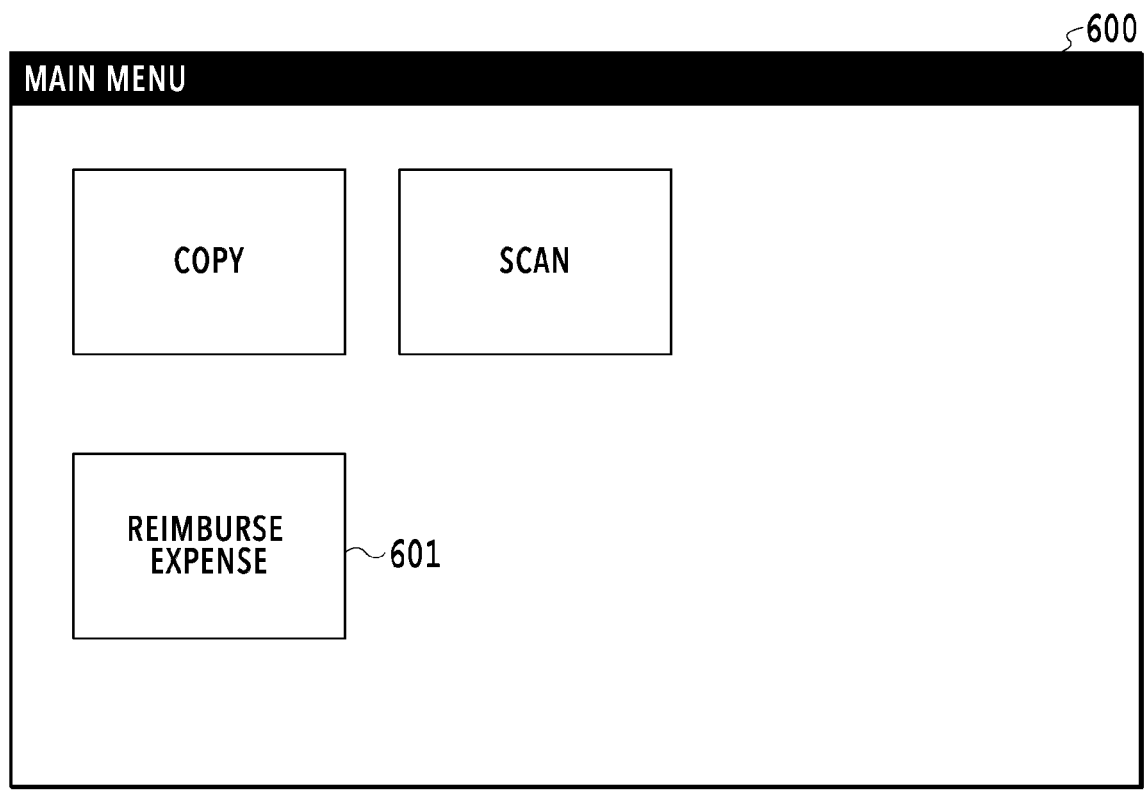
FIG. 6 is diagram illustrating a main screen on the MFP according to the embodiment.

FIG. 6 is a diagram illustrating an example of a main screen 600. A button 601 for reimbursing expenses is displayed in the main screen on the MFP 110 by installing an additional application for reimbursing expenses (hereinafter referred to as the expense reimbursement app) into the MFP 110. Pressing this expense reimbursement button displays a screen for reimbursing expenses and starts the processing illustrated in the sequence chart of FIG. 5.

Figure 7:
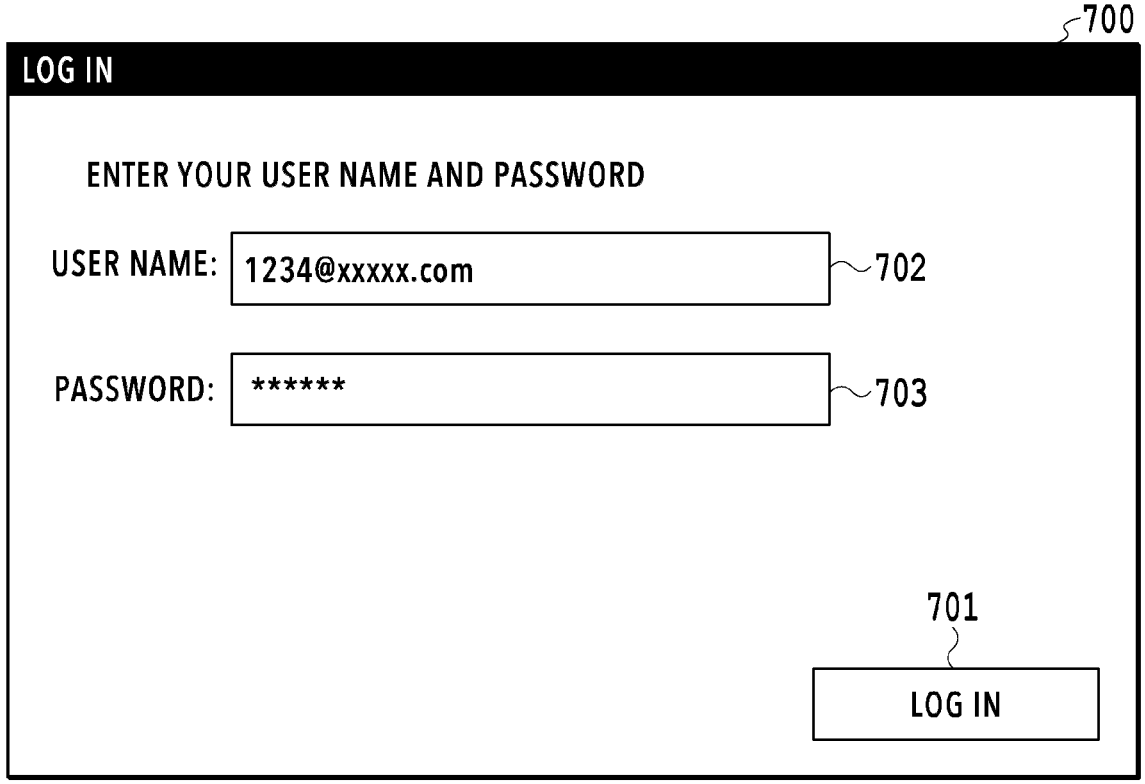
FIG. 7 is diagram illustrating a login screen on the MFP according to the embodiment.

In S501, with the expense reimbursement app, the MFP 110 displays a login screen for entering authentication information for accessing the MFP cooperative service 120. FIG. 7 illustrates an example of a login screen 700 displayed on the MFP 110.

In S502, with the expense reimbursement app, the MFP 110 transmits a user name and a password entered into the login screen to the MFP cooperative service 120 as a login request in response to pressing a "LOG IN" button 701.

In S503, with the request control unit 431, the MFP cooperative service 120 verifies whether the user name and the password contained in the login request have been registered in the MFP cooperative service 120, and returns an access token to the MFP 110 if the user name and the password have been registered. The various requests to be subsequently issued from the MFP 110 to the MFP cooperative service 120 will be issued along with this access token, and the processing target user is identified by using this information. As for the user authentication method, a generally and publicly known method (such as Basic authentication, Digest authentication, or authentication using OAuth) is used to perform the user authentication.

Figure 8:
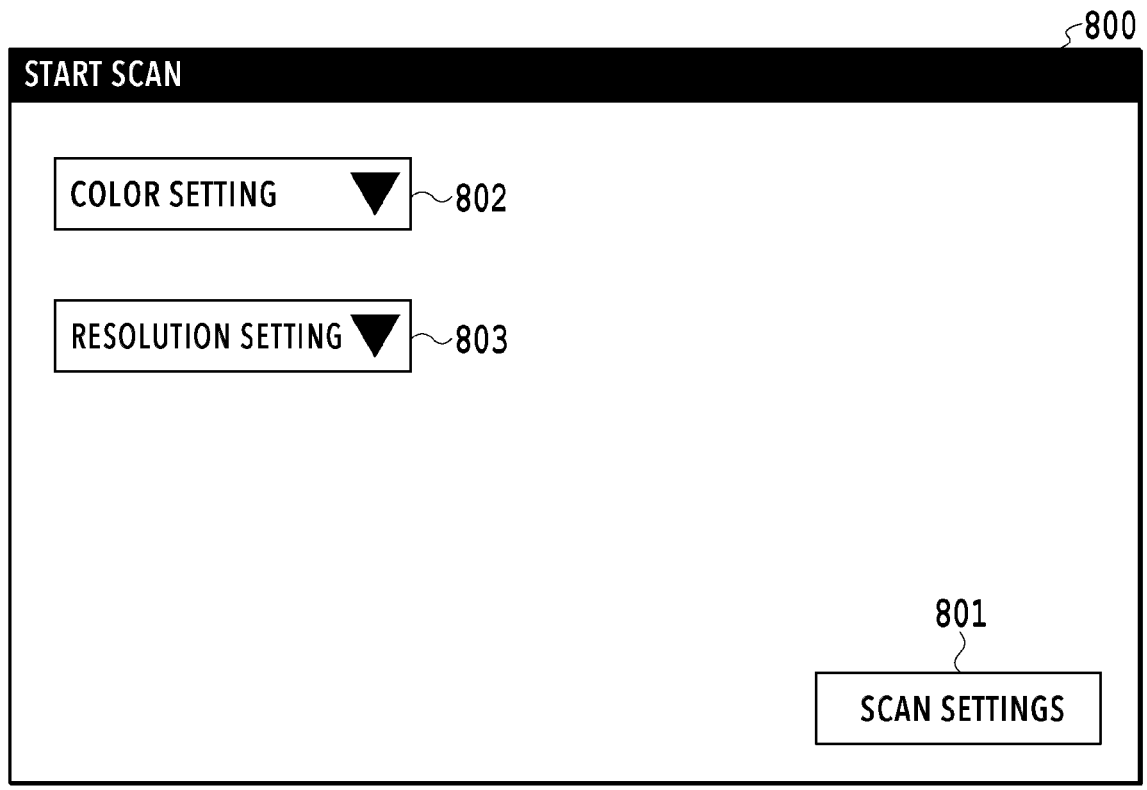
FIG. 8 is diagram illustrating a scan setting screen on the MFP according to the embodiment.

After the login process is completed, the MFP 110 displays a scan setting screen in S504. FIG. 8 illustrates an example of a scan setting screen 800 displayed on the MFP 110.

In S505, the MFP 110 obtains various scan settings for reading designated on the scan setting screen 800, and scans documents to be scanned, such as receipts, placed on the manuscript table glass in response to pressing a "START SCAN" button 801.

In S506, the MFP 110 transmits the scanned image read by performing the scan and a request to analyze the scanned image to the MFP cooperative service 120.

In S507, in response to receiving the scanned image analysis request with the request control unit 431 of the MFP cooperative service 120, the MFP cooperative service 120 starts a multi-cropping process on the scanned image with the image processing unit 432 of the MFP cooperative service 120.

Figure 11:
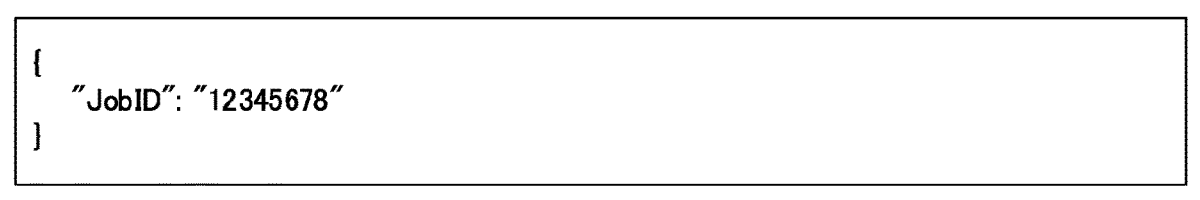

Then in S508, the MFP cooperative service 120 returns a job ID uniquely indicating the analysis request received by the request control unit 431 of the MFP cooperative service 120 to the MFP 110 without waiting until the multi-cropping process is finished. An example of the job ID is illustrated in FIG. 11.

In S509, with the image processing unit 432, the MFP cooperative service 120 performs image analysis such as a rotation process, an optical character recognition (OCR) process, and document type detection on each piece of document image data detected by the multi-cropping process. In the rotation process, firstly, edges of the image are displayed horizontally or vertically on the liquid crystal display unit of the operation unit 220. Also, the characters appearing in the piece of document image data are detected, and the image is rotated in such a direction that the characters are oriented in a predetermined direction. Thereafter, more detailed character recognition and image recognition are performed to extract the character strings in the piece of document image data and determine the type of the document appearing in the piece of document image data.

From S508 through S510, the MFP 110 checks the MFP cooperative service 120 for the processing status of the image analysis in S509 based on the job ID received in S507 on a regular basis (e.g., every three seconds). In response to receiving the processing status check request in S508, the MFP cooperative service 120 checks the processing status corresponding to the job ID and, if the processing is still being performed, returns response data as illustrated in FIG. 12A. The process of returning this response data to the MFP 110 is continued until response data indicating completion of the image analysis by the MFP cooperative service 120 is obtained, that is, until the timing of S510.

In S510, if the image analysis has been completed, the MFP cooperative service 120 returns response data that contains a content as illustrated in FIG. 12B, indicating the completion of the image analysis, from the request control unit 431 to the MFP 110. The response data indicating the completion of the image analysis also contains metadata detected from each piece of document image data contained in the scanned image as well as the status.

Pieces of information contained in the response data illustrated in FIG. 12B, indicating the completion of the image analysis, will be described below.

"Images" stores information of each piece of document image data detected by the multi-cropping process. In the embodiment, "ImageID", "ContentsType", "ReceiptData", and "Points" are stored for each piece of document image data.

"ImageID" represents an ID of the piece of document image data detected by the multi-cropping process. By designating an ImageID and transmitting a document image data obtaining request to the MFP cooperative service 120, the target piece of document image data corresponding to the ImageID can be obtained.

"ContentsType" represents the type of the document appearing in the piece of document image data. Examples include character strings such as "Receipt" in the case of a "receipt", "BusinessCard" in the case of a "business card", and "CustomerCopy" in the case of a "credit card sales slip customer copy (hereinafter referred to as "copy")". The type of the document is determined based on the character strings contained in the piece of document image data, the size of the image, and so on. For example, the document will be determined as "Receipt" if a character string "receipt" can be detected from the piece of document image data, and the document will be determined as a "Copy" if a character string "credit card sales slip customer copy" can be detected from the piece of document image data. Note that "ContentsType" will be "Unknown" if the type of the document cannot be determined. Examples of the case where the type of the document is determined as "Unknown" include cases where the document appearing in the piece of document image data is a receipt was not properly read, the back of a receipt, or an irrelevant document without information necessary for determining the type of the document.

"ReceiptData" is included in a case where "ContentsType" is "Receipt" representing a receipt or "CustomerCopy" representing a copy. "Date" stores a value representing the date of obtaining the piece of document image data, and "Amount" stores a value representing the total amount of money. There is a case where each piece of document image data uses a different expression of date, as described in table 1. For this reason, the date on each document is normalized into a predefined uniform format and then stored as the value of "Date". In the embodiment, the uniform date format is defined as an eight-digit number including four digits for the year, two digits for the month, and two digits for the day.

TABLE 1

| Unnormalized date expression | Normalized date expression |
| --- | --- |
| 2017 Jan. 5 | 2017 Jan. 5 |
| 2018 Jul. 4 | 2018 Jul. 4 |
| Dec. 17, 2010 | 2010 Dec. 17 |
| Dec. 17, Heisei 22 | 2010 Dec. 17 |

"Points" stores coordinates representing in which region in the entire scanned image the image of the document is located. The X and Y coordinates at an upper left point and the X and Y coordinates at points following this upper left point in the clockwise direction about the center of the scanned image are stored in this order from the initial position.

In S511, the MFP 110 designates the "ImageID" of a piece of document image data to be displayed first and transmits a document image data obtaining request to the MFP cooperative service 120. The MFP cooperative service 120 then returns the piece of document image data corresponding to the "ImageID" to the MFP 110. In doing so, the MFP cooperative service 120 performs a rotation process on the piece of document image data to be returned to the MFP 110, and returns the piece of document image data oriented in a predetermined direction.

In S512, the MFP 110 transmits a metadata obtaining request to the MFP cooperative service 120.

In response to receiving the metadata obtaining request from the MFP 110, the MFP cooperative service 120 obtains metadata (FIG. 13) on the target user from the expense reimbursement system 130 in S513. FIG. 13 is an example of the metadata to be returned by the MFP cooperative service 120 and the expense reimbursement system 130 as response data for the metadata obtaining request.

"ExpenseTypes" represents a list of defined values indicating the purposes of use of the documents appearing in pieces of document image data to be registered in the expense reimbursement system 130. Each type contains "ID" and "Name". In the description of the embodiment, the MFP cooperative service 120 returns the pieces of metadata obtained from the expense reimbursement system 130 as they are to the MFP 110. Note that the present disclosure is not limited to this case. In a case where the information of a plurality of pieces of metadata is required, the MFP cooperative service 120 may request the expense reimbursement system 130 to obtain these pieces of metadata and, when returning them to the MFP 110, combine the pieces of metadata into a single piece of metadata and return it. Also, the MFP cooperative service 120 may thin down the pieces of metadata returned from the expense reimbursement system 130 into only information necessary for the MFP 110.

In S514, based on the result of the character recognition on each piece of document image data obtained by the multi-cropping process, the MFP 110 performs a related-data determination for identifying a plurality of pieces of document image data that are assumed to be related to the same transaction as related pieces of data.

Figure 9A:
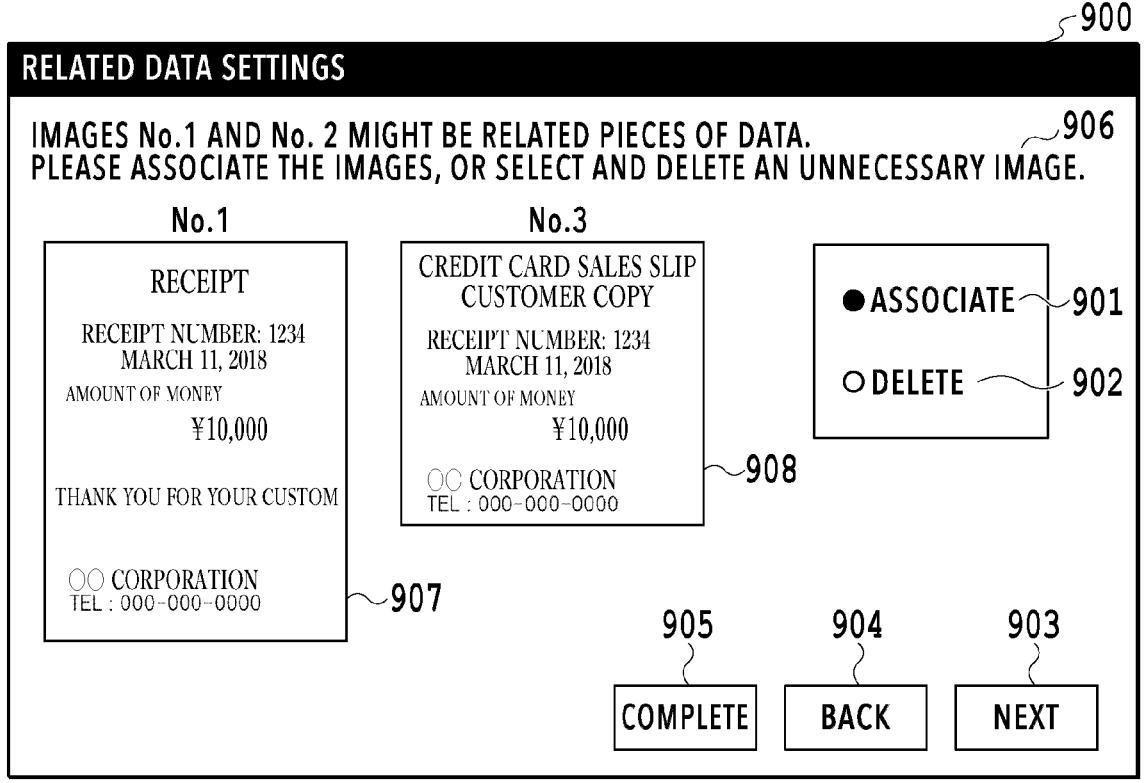
FIG. 9A is a diagram illustrating a related-data/identical-data setting screen on the MFP according to the embodiment.

In S515, the MFP 110 displays a related-data setting screen 900 as illustrated in FIG. 9A if determining in the related-data determination that documents assumed to be related to the same transaction have been scanned simultaneously. The related-data setting screen 900 has document image data integrating functions such as integrating and associating a plurality of pieces of document image data related to the same transaction and deleting an unnecessary piece(s) of document image data. Such a configuration enables the user to easily select one of pieces of document image data which have been obtained simultaneously by the multi-cropping process and in which a plurality of documents related to the same transaction appear, as a target to be registered. Details of S514 and S515 will be described later by using a flowchart.

Figure 9B:
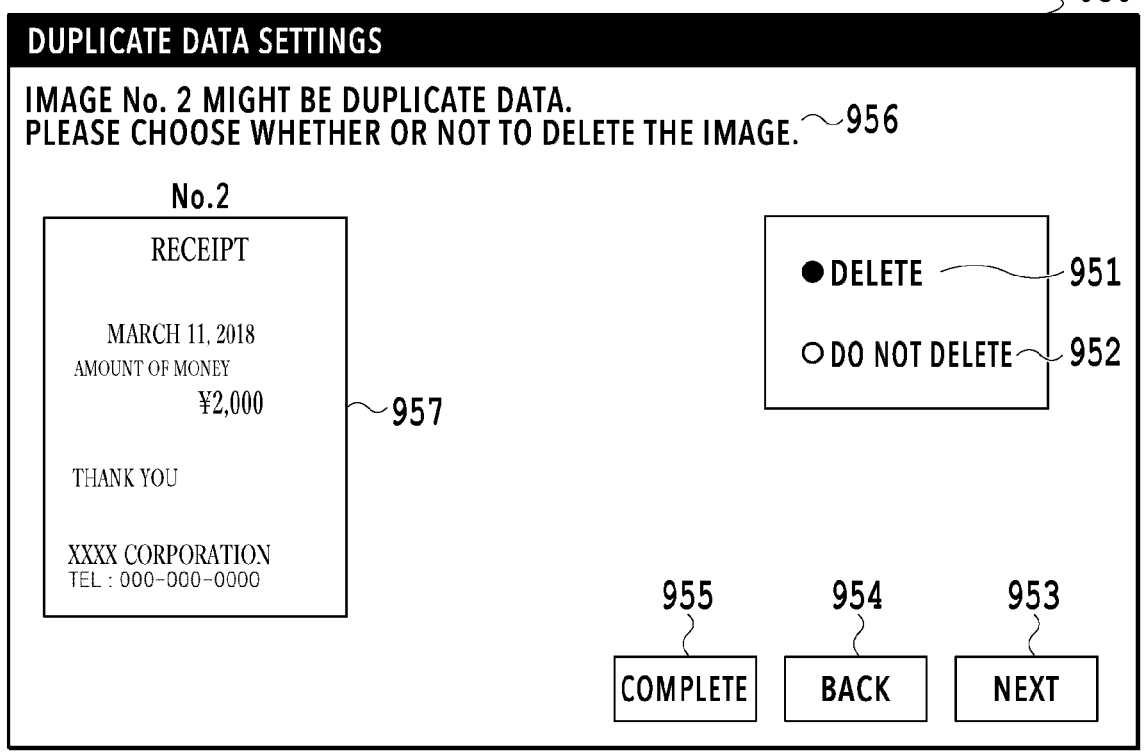
FIG. 9B is a diagram illustrating a related-data/identical-data setting screen on the MFP according to the embodiment.

S516 to S518 are processes related to displaying a duplicate-data setting screen 950 as illustrated in FIG. 9B. The duplicate-data setting screen 950 has a function of deleting an unnecessary image.

In S516, the MFP 110 transmits a metadata duplication determination request to the MFP cooperative service 120. The transmitted metadata duplication determination request contains the date information, money amount information, and image features (such as the arrangement of characters and the size of the paper sheet) obtained from the pieces of document image data in the image analysis in S509.

In S517, in response to receiving the metadata duplication determination request from the MFP 110, the MFP cooperative service 120 transmits the metadata duplication determination request to the expense reimbursement system 130. Thereafter, the MFP cooperative service 120 obtains the result of a metadata duplication determination from the expense reimbursement system 130, and transmits the obtained result of the metadata duplication determination to the MFP 110. Here, the expense reimbursement system 130 determines whether data matching the received information (date information, money amount information, and image features) is held in the expense reimbursement system. If data that matches the information is present, the expense reimbursement system 130 determines that duplicate data being already registered information is present in the expense reimbursement system 130. Based on the obtained result of the metadata duplication determination, the MFP 110 determines whether it has scanned a duplicate document.

In S518, the MFP 110 displays the duplicate-data setting screen 950 if determining that a plurality of documents assumed to be related to the same transaction have been scanned simultaneously.

In S519, based on each piece of document image data after the multi-cropping process obtained in S510 and the metadata obtained in S513, the MFP 110 displays a metadata setting screen 1000 as illustrated in FIG. 10 for setting the metadata of the piece of document image data. Details of the metadata setting screen 1000 will be described later by using a flowchart. As many metadata setting screens 1000 as the number of pieces of scanned and detected document image data are displayed. However, if a piece of document image data has been associated with another piece of document image data or has been deleted in the processes of S514 through S519, the metadata setting screen 1000 for this piece of document image data will not be displayed.

In S520, in response to pressing a "TRANSMIT" button 1001 after metadata is set for all pieces of document image data displayed, the MFP 110 transmits the information set on the metadata setting screens 1000 to the MFP cooperative service 120. FIG. 14 illustrates an example of the information set on one of the metadata setting screens 1000 transmitted from the MFP 110 to the MFP cooperative service 120. Pieces of information corresponding respectively to the contents set on the metadata setting screen 1000 are added. Note that the example is the information of metadata corresponding to a single piece of document image data and it is therefore necessary to transmit as many metadata setting requests as the number of pieces of document image data. However, the configuration may be such that a plurality of metadata setting requests can be combined and transmitted.

In S521, in response to receiving the metadata setting request(s), the MFP cooperative service 120 transmits the pieces of document image data and the metadata setting request(s) to the expense reimbursement system 130 based on the received information. In response to receiving the metadata setting request(s), the expense reimbursement system 130 sets the received pieces of information in the expense information managed in the expense reimbursement system 130, and returns response data indicating the completion of the setting of the metadata to the MFP cooperative service 120. In response to receiving the response data indicating the completion of the setting of the metadata from the expense reimbursement system 130, the MFP cooperative service 120 returns response data indicating the completion of the setting of the metadata to the MFP 110.

[Details of Processing by MFP]

Figure 15:
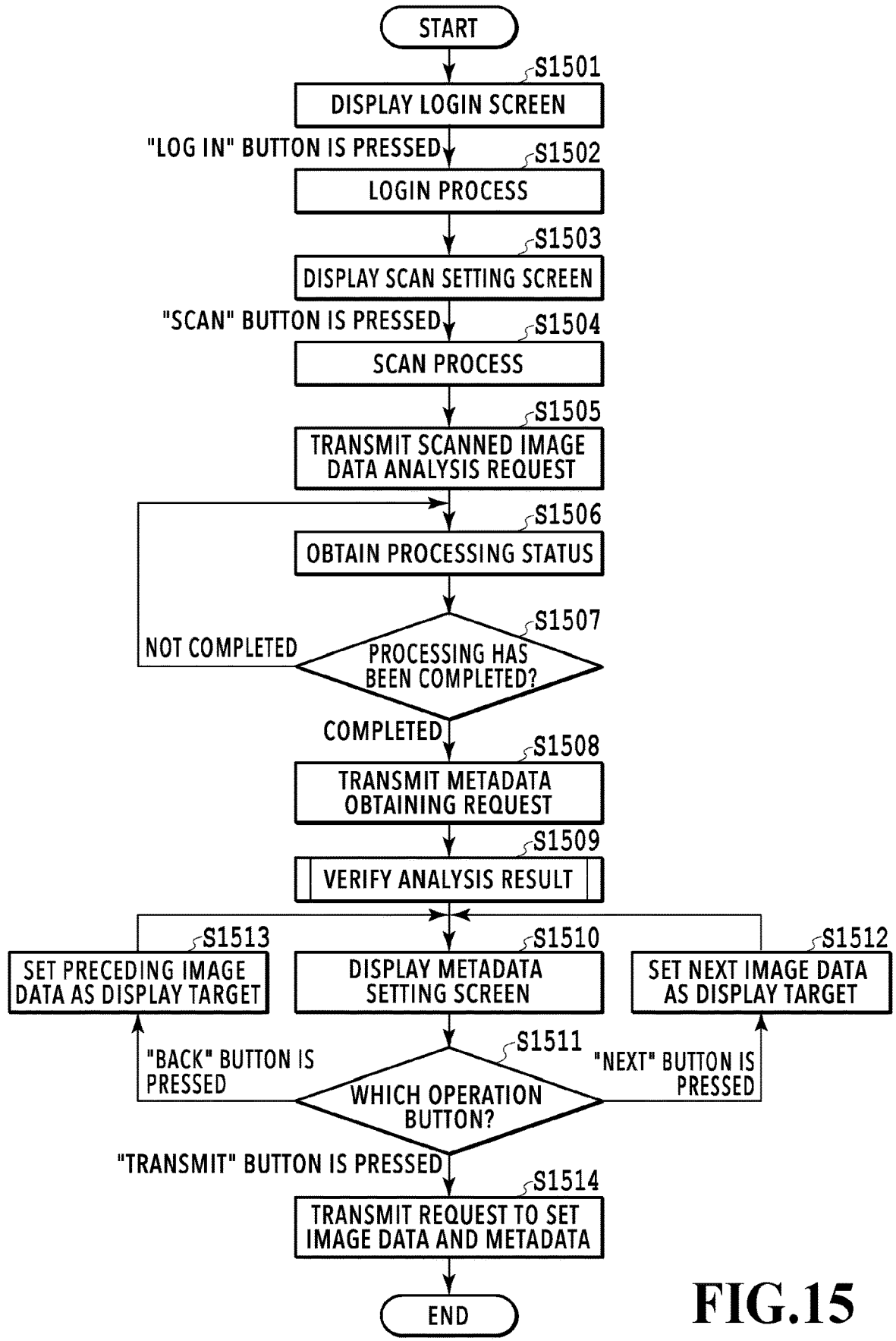
FIG. 15 is a flowchart illustrating an expense reimbursement process by the MFP according to the embodiment.

FIG. 15 is flowchart illustrating details of processing by the MFP 110 for performing an expense reimbursement process. The control unit 210 implements this series of processes by causing the CPU 211 to execute the control program stored in the HDD 214. Details will be described below.

This processing is started in response to detecting pressing of the "REIMBURSE EXPENSE" button 601 in the main screen (FIG. 6) on the MFP 110.

In S1501, the display control unit 421 of the MFP 110 displays a login screen 700 as illustrated in FIG. 7. On the login screen 700, the user can enter a user name into a text entry area 702 and a password into a text entry area 703 and press the "LOG IN" button 701 to start the expense reimbursement process. In response to detecting the pressing of the "LOG IN" button 701, the display control unit 421 requests the cooperative service request unit 423 of the MFP 110 to log in.

In S1502, the cooperative service request unit 423 of the MFP 110 transmits a login request to the request control unit 431 of the MFP cooperative service 120. The request control unit 431 accesses the data management unit 434 and checks whether the login information is valid, and returns an access token to the cooperative service request unit 423 if the login information is valid.

In S1503, the display control unit 421 of the MFP 110 displays a scan setting screen. FIG. 8 is a diagram illustrating an example of the scan setting screen 800. A "COLOR SETTING" button 802 is a button for setting a color mode or a monochrome mode for scanning documents. A "RESOLUTION SETTING" button 803 is a button for setting the resolution for scanning documents. During determination of the settings using these setting buttons 802 and 803, settable candidates (options) supported by the MFP 110 are displayed, and the user selects desired ones from among the displayed candidates.

Note that the above setting buttons are an example. Not all of the setting items may be present, and/or other setting items may be present. Also, the setting values of the resolution, the color settings, and the like may be limited only to setting values required by the expense reimbursement system. The user determines detailed settings for the scan process via the scan setting screen 800 as above.

In S1504, the display control unit 421 of the MFP 110 instructs the scan instruction unit 422 of the MFP 110 to perform a scan in response to detecting pressing of the "START SCAN" button 801 as an instruction to start a scan process on documents set on the manuscript table glass. The scan instruction unit 422 scans the documents by instructing the scan execution unit 411 of the MFP 110 to perform a scan. The scanned image data generated by the scan is stored in the image data storage unit 412 of the MFP 110, and the scan instruction unit 422 is notified of a corresponding scanned image identifier. In S1504, a screen indicating that the scan is being performed (not illustrated) may be displayed.

In S1505, the cooperative service request unit 423 of the MFP 110 transmits the scanned image obtained via the scan instruction unit 422 of the MFP 110 to the request control unit 431 of the MFP cooperative service 120 along with a scanned image analysis request. The request control unit 431 takes the scanned image out of the scanned image analysis request and passes the scanned image to the image processing unit 432 of the MFP cooperative service 120 to execute a multi-cropping process on it. After the image processing unit 432 completes the multi-cropping process, the request control unit 431 subsequently causes the image processing unit 432 to perform an image rotation process, a document type determination process, and character recognition. The request control unit 431 returns a job ID to the cooperative service request unit 423 as soon as requesting the multi-cropping process, without waiting until the multi-cropping process to be completed. The job ID is a value that enables unique identification of the scanned image analysis performed in the MFP cooperative service 120.

In S1506, in response to obtaining the job ID, the cooperative service request unit 423 of the MFP 110 transmits a processing status obtaining request to the request control unit 431 of the MFP cooperative service 120. The request control unit 431 inquires of the image processing unit 432 of the MFP cooperative service 120 the status of the image analysis with the job ID contained in the processing status obtaining request. If the image analysis with the job ID is still being performed, the image processing unit 432 returns information indicating that the image analysis is still being performed. If the processing has been completed, the image processing unit 432 returns information indicating that the processing has been completed, pieces of document image data detected by the multi-cropping process, and the result of the analysis of each document image to the request control unit 431. The request control unit 431 generates response data for the processing status obtaining request from the information processed by the image processing unit 432 and returns this response data to the cooperative service request unit 423.

In S1507, the cooperative service request unit 423 of the MFP 110 checks the processing status obtained in S1506. If the processing status is a value indicating the processing is still being performed, the cooperative service request unit 423 waits for several seconds and returns to S1506, and repeats the process of transmitting a processing status obtaining request to the request control unit 431 of the MFP cooperative service 120 again. If the processing status is a value indicating that the processing has been completed, the cooperative service request unit 423 obtains the pieces of document image data and the result of the image analysis thereof, which is pieces of metadata, as the response data for the processing status obtaining request.

In S1508, the cooperative service request unit 423 of the MFP 110 transmits a metadata obtaining request to the request control unit 431 of the MFP cooperative service 120 along with the access token. In response to receiving the metadata obtaining request, the request control unit 431 requests the expense reimbursement system request unit 433 of the MFP cooperative service 120 to obtain metadata. The expense reimbursement system request unit 433 then obtains user information associated with the access token and registered in the expense information management unit 442 of the expense reimbursement system 130, and transmits a request to obtain metadata on the target user to the request control unit 441 of the expense reimbursement system 130. In response to receiving the metadata obtaining request, the request control unit 441 obtains the metadata from the expense information management unit 442 and returns it to the expense reimbursement system request unit 433. The expense reimbursement system request unit 433 returns the obtained metadata to the cooperative service request unit 423 through the request control unit 431.

In S1509, based on the result of the character recognition on each piece of document image data obtained by performing the multi-cropping process, the display control unit 421 of the MFP 110 makes various determinations on each piece of document image data. Specifically, the display control unit 421 determines the type of the document appearing in each piece of document image data, the presence/absence of a plurality of pieces of document image data assumed to be related to the same transaction, and whether any of the pieces of document image data has already been registered in the expense reimbursement system 130. Details of S1509 will be described below.

Figure 16B:
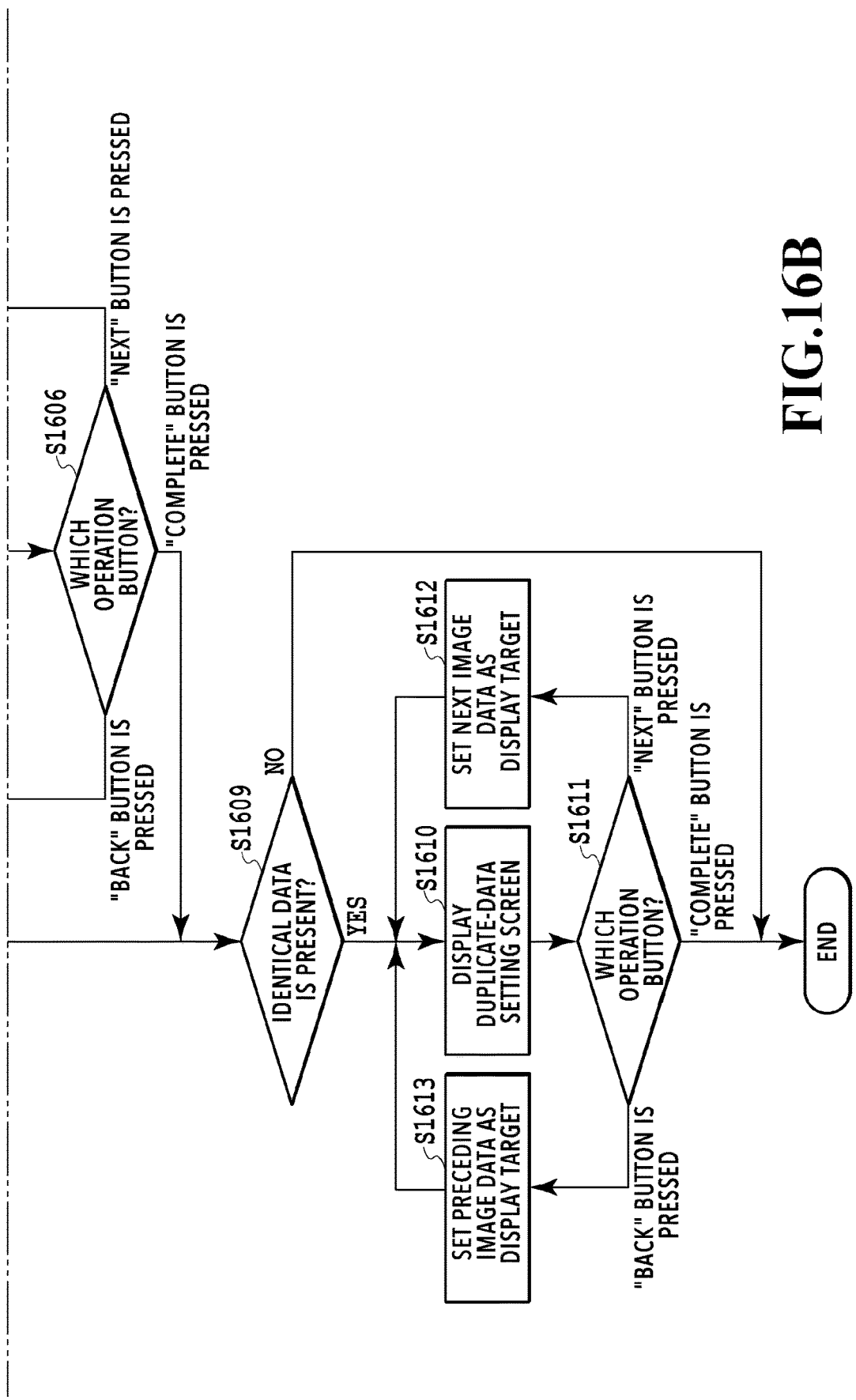

FIG. 16 is a flowchart illustrating details of the processing by the MFP 110 for determining the type of the document appearing in each piece of document image data and displaying a screen(s) corresponding to the result of the determination. The control unit 210 implements this series of processes by causing the CPU 211 to execute the control program stored in the HDD 214. Details will be described below.

In S1601, for each piece of document image data, the display control unit 421 of the MFP 110 determines whether the type of the document appearing in the piece of document image data is a receipt. The display control unit 421 proceeds to S1609 if the type of the document appearing in the piece of document image data is a receipt, and proceeds to S1602 if the type of the document appearing in the piece of the document image data is not a receipt. The type of the document appearing in each piece of document image data can be obtained from the response data obtained in S1507. For example, in the case of the response data of FIG. 12B, two pieces of document image data ("image0001" and "image0002") are receipts ("ContentsType" is "Receipt" representing a receipt). The remaining one piece of document image data ("image0003") is a copy ("ContentsType" is "CustomerCopy" representing a copy).

In S1602, the display control unit 421 of the MFP 110 determines whether the type of the document appearing in the piece of document image data is a copy. The display control unit 421 proceeds to S1604 if the type of the document appearing in the piece of document image data is a copy, and proceeds to S1603 if the type of the document appearing in the piece of the document image data is not a copy.

In S1603, the display control unit 421 of the MFP 110 determines whether the type of the document appearing in the piece of document image data is "Unknown" and date information and money amount information have been obtained. This S1603 is a process for detecting a file for which the type of the document appearing in the piece of document image data could not be determined in S1601 and S1602 but is likely to be a receipt or a copy. If the type of the document appearing in the piece of document image data is "Unknown" and date information and money amount information have been obtained, the display control unit 421 determines that the type of the document appearing in the piece of document image data is likely to be a receipt or a copy, and proceeds to S1604. If, on the other hand, the type of the document appearing in the piece of document image data is "Unknown" and date information or money amount information has not been obtained, the display control unit 421 determines that the type of the document appearing in the piece of document image data is not likely to be a receipt or a copy, and proceeds to S1609.

In S1604, the display control unit 421 of the MFP 110 determines whether related data is present from the result of the multi-cropping process and the result of the analysis of each piece of document image data. If the date information or the money amount information matches, the display control unit 421 determines that the related data is present, and proceeds to S1605. If, on the other hand, the date information or the money amount information is different, the display control unit 421 determines that no related data is present, and proceeds to S1609. In the case of the response data of FIG. 12B, "Image0001" and "image0003" have "20180313" as the date information and "10000" as the money amount information. For this reason, "Image0001" and "Image0003" can be determined as pieces of related data. In other words, the user might have scanned a receipt and a copy simultaneously.

In S1605, the display control unit 421 of the MFP 110 displays a related-data setting screen 900 as illustrated in FIG. 9A. In doing so, the display control unit 421 simultaneously displays the two or more pieces of document image data determined as related pieces of data in S1604 in the related-data setting screen 900. Then, if obtaining a user input indicating that the displayed pieces of document image data are pieces of document image data related to the same transaction, the display control unit 421 performs a process of integrating these displayed pieces of document image data.

The related-data setting screen 900 of FIG. 9A includes an "ASSOCIATE" button 901 for associating the displayed pieces of document image data with each other and a "DELETE" button 902 for deleting a selected piece of document image data. The buttons 901 and 902 are radio buttons, only one of which is selectable. A "COMPLETE" button 905 executes the process corresponding to the selected radio button on the piece(s) of document image data. The "COMPLETE" button 905 is a button for executing the process associated with the selected radio button (901 or 902).

More specifically, in a case where the "ASSOCIATE" button 901 is selected, pieces of document image data 907 and 908 displayed under a message 906 are associated with each other. The plurality of associated pieces of document image data will be handled as a single piece of document image data in the subsequent processing, or a single piece of metadata that is common to the pieces of metadata of these pieces of document image data is set.

In a case where the "DELETE" button 902 is selected, one of the pieces of document image data 907 and 908 displayed under the message 906 is selected to delete the selected piece of document image data. For example, in a case where the user determines that the piece of document image data 908 is an irrelevant image, the user selects the "DELETE" button 902, selects the piece of document image data 908, and presses the "COMPLETE" button 905 to delete the piece of document image data 908. The deleted piece of document image data will not be handled as a processing target in the subsequent processing.

Note that the "COMPLETE" button 905 may be disabled until all related pieces of document image data are displayed and settings are made. A "NEXT" button 903 is a button for displaying the next pieces of document image data determined as related pieces of data in the related-data setting screen. The "NEXT" button 903 is not displayed in a case where the last pieces of document image data determined as related pieces of data are displayed. A "BACK" button 904 is a button for displaying the immediately preceding pieces of document image data determined as related pieces of data in the related-data setting screen. The "BACK" button 904 is not displayed in a case where the first document image data of related data are displayed.

In S1606, the display control unit 421 of the MFP 110 detects the selected button in the related-data setting screen 900. The display control unit 421 proceeds to S1607 if detecting that the "NEXT" button 903 is pressed, proceeds to S1608 if detecting that the "BACK" button 904 is pressed, and proceeds to S1609 if detecting that the "COMPLETE" button 905 is pressed.

In S1607, the display control unit 421 of the MFP 110 sets the next pieces of document image data determined as related pieces of data and to be displayed after the currently displayed images as the display targets to be displayed in the related-data setting screen 900, and returns to S1605.

In S1608, the display control unit 421 of the MFP 110 sets the pieces of document image data determined as related pieces of data and immediately preceding the currently displayed images as the display targets to be displayed in the related-data setting screen 900, and returns to S1605.

In S1609, the display control unit 421 of the MFP 110 determines whether an identical piece of data is present in the information stored in the expense reimbursement system 130. If an identical piece of data is present, it is possible to determine that the scanned piece of document image data has already been registered in the system. The display control unit 421 compares each piece of information stored in the expense reimbursement system 130 and each piece of document image data obtained as a result of the multi-cropping process with each other, and determines that they are identical pieces of data if all of the date information, the money amount information, and the image features are the same. The display control unit 421 then proceeds to S1610. If, on the other hand, even one of the date information, the money amount information, and the image features is different, the display control unit 421 determines that they are not identical pieces of data, and terminates the processing. The content of the image feature comparison process is the same as that in Japanese Patent Laid-Open No. 2006-330863, and description thereof is therefore omitted in the present application.

In S1610, the display control unit 421 of the MFP 110 displays the identical-data setting screen 950. The piece of document image data displayed in the identical-data setting screen 950 in this step is a piece of document image data for which it has been determined in S1609 that an already registered identical piece of data is present, among the pieces of document image data corresponding to the "imageID" contained in the response data in S1506.

FIG. 9B is a diagram illustrating an example of the identical-data setting screen 950. A "DELETE" button 951 and a "DO NOT DELETE" button 952 are radio buttons. A "COMPLETE" button 955 executes the process corresponding to the selected radio button on the piece of document image data displayed in the identical-data setting screen 950. The "COMPLETE" button 955 is a button for executing the process associated with the selected radio button (951 or 952). More specifically, in a case where the "DELETE" button 951 is selected, a piece of document image data 957 displayed under a message 956 is deleted. In a case where the "DO NOT DELETE" button 952 is selected, the piece of document image data 957 is not deleted. For example, in a case where the user determines that the piece of document image data 957 is an already registered piece of document image data, the user selects the "DELETE" button 951 for deleting the piece of document image data 957 and presses the "COMPLETE" button 955 to delete the piece of document image data 957. The deleted piece of document image data will not be handled as a processing target in the subsequent processing. Note that the "COMPLETE" button 955 may be disabled until all pieces of document image data for which it has determined that already registered identical pieces of data are present are displayed and settings are made. A "NEXT" button 953 is a button for displaying the next piece of document image data for which it has been determined that an already registered identical piece of data is present in the identical-data setting screen 950. The "NEXT" button 953 is not displayed in a case where the last piece of document image data for which it has been determined that an already registered identical piece of data is present is displayed. A "BACK" button 954 is a button for displaying the immediately preceding piece of document image data for which it has been determined that an already registered identical piece of data is present in the identical-data setting screen 950. The "BACK" button 954 is not displayed in a case where the first piece of document image data for which it has been determined that an already registered identical piece of data is present is displayed. In the embodiment, only a piece of document image data obtained by the scan is displayed in the identical-data setting screen 950. However, a piece of document image data being the already registered identical piece of data may be obtained from the expense reimbursement system 130, and this piece of document image data may be displayed as well.

In S1611, the display control unit 421 of the MFP 110 detects the selected button in the identical-data setting screen 950. The display control unit 421 proceeds to S1612 if detecting in S1611 that the "NEXT" button 953 is pressed, proceeds to S1613 if detecting that the "BACK" button 954 is pressed, and terminates the processing if detecting that the "COMPLETE" button 955 is pressed.

In S1612, the display control unit 421 of the MFP 110 sets the next piece of document image data for which it has been determined that an already registered identical piece of data is present and which is to be displayed after the currently displayed piece of document image data as the display target, and returns to S1610. Then, the display control unit 421 displays this piece of document image data set as the display target in the identical-data setting screen 950.

In S1613, the display control unit 421 of the MFP 110 sets the piece of document image data immediately preceding the currently displayed piece of document image data as the display target, and returns to S1610. Then, the display control unit 421 displays this piece of document image data set as the display target in the identical-data setting screen 950.

The description of the flowchart of FIG. 16 describing S1509 in detail ends here.

Now, return to the flowchart of FIG. 15.

In S1510, the display control unit 421 of the MFP 110 displays a metadata setting screen. FIG. 10 is a diagram illustrating an example of the metadata setting screen 1000. The "TRANSMIT" button 1001 is a button for performing a process of transmitting pieces of metadata set in entry areas 1004 to 1007 to the MFP cooperative service 120. The "TRANSMIT" button 1001 may be disabled until all pieces of document image data obtained as a result of the multi-cropping process are displayed and settings are made. A "NEXT" button 1002 is a button for displaying a metadata setting screen 1000 for the next piece of document image data. The "NEXT" button 1002 is not displayed in a case where the last piece of document image data is displayed. A "BACK" button 1003 is a button for displaying a metadata setting screen 1000 for the immediately preceding piece of document image data. The "BACK" button 1003 is not displayed in a case where the first piece of document image data is displayed.

The expense type entry area 1004 is an entry area to display a list for selecting the expense type of the receipt appearing in the target piece of document image data in the form of a pull-down menu or the like. Predetermined items contained in the metadata obtained in S1508 are listed as the list of expense types displayed on the list. In the case of the metadata exemplarily illustrated in FIG. 13, a list of "Name" are displayed.

The transaction date text entry area 1005 is an entry area to enter the transaction date on the receipt appearing in the target piece of document image data. In the initial state, the "Date" in the "ReceiptData" of the currently displayed piece of document image data in the response data obtained in S1506 is entered. In a case where no date is present, the present date set in the MFP 110 is entered. Also, in response to selecting the transaction date text entry area 1005, a keyboard (not illustrated) is displayed in the screen, with which any date can be entered.

The money amount text entry area 1006 is an entry area to enter the total amount of money on the receipt appearing in the target piece of document image data. In the initial state, the "Amount" in the "ReceiptData" of the currently displayed piece of document image data in the response data obtained in S1506 is entered. Also, in response to selecting the money amount text entry area 1006, a keyboard (not illustrated) is displayed in the screen, with which any numeric value can be entered.

The location text entry area 1007 is an entry area to enter the location where the receipt appearing in the target piece of document image data was issued. In response to selecting the location text entry area 1007, a keyboard (not illustrated) is displayed in the screen, with which any character string can be entered. Location ("Location") list information may be additionally provided to the metadata obtained in S1508, and this list may be displayed.

A scanned image 1008 is a piece of document image data to be associated with the pieces of metadata set in the entry areas 1004 to 1007. In a case where pieces of document image data associated with each other on the related-data setting screen 900 are present, the associated pieces of document image data may be displayed in the metadata setting screen 1000 or a message or the like (not illustrated) indicating the pieces of document image data have been associated with each other may be displayed.

In S1511, the display control unit 421 of the MFP 110 detects the selected button in the metadata setting screen 1000. The display control unit 421 proceeds to S1512 if detecting in S1511 that the "NEXT" button 1002 is pressed, proceeds to S1513 if detecting that the "BACK" button 1003 is pressed, and proceeds to S1514 if detecting that the "TRANSMIT" button 1001 is pressed.

In S1512, the display control unit 421 of the MFP 110 sets the next piece of document image data to be displayed after the currently displayed piece of document image data as the display target and returns to S1512, in which the display control unit 421 displays this piece of document image data in the metadata setting screen 1000.

In S1513, the display control unit 421 of the MFP 110 sets the piece of document image data immediately preceding the currently displayed piece of document image data as the display target and returns to S1512, in which the display control unit 421 displays this piece of document image data in the metadata setting screen 1000.

In S1514, the cooperative service request unit 423 of the MFP 110 transmits metadata setting requests each containing the metadata of a piece of document image data set on the metadata setting screen 1000 to the request control unit 431 of the MFP cooperative service 120.

FIG. 14 illustrates an example of a metadata setting request to be transmitted to the MFP cooperative service 120. The metadata setting request contains pieces of information indicating the expense type (ExpenseTypeID), the transaction date (TransactionDate), the amount of money (Amount), and the location (Location) set on the metadata setting screen 1000. Also, the image data is converted into character strings, which will be handled as a body (not illustrated) in a case they are requested. In a case where a plurality of pieces of document image data have been associated with each other, a similar process is performed on the associated pieces of document image data. The "ImageID" is designated by a requested URL itself or URL parameter. In response to receiving the metadata setting requests, the request control unit 431 of the MFP cooperative service 120 requests the expense reimbursement system request unit 433 of the MFP cooperative service 120 to register the pieces of document image data corresponding to the pieces of metadata and set the pieces of metadata.

In response to receiving the metadata setting requests from the request control unit 431 of the MFP cooperative service 120, the expense reimbursement system request unit 433 of the MFP cooperative service 120 obtains the user information in the expense reimbursement system 130 associated with the access token. Then, the expense reimbursement system request unit 433 transmits a request to set the pieces of metadata on the target user to the request control unit 441 of the expense reimbursement system 130. In response to receiving the metadata setting request, the request control unit 441 of the expense reimbursement system 130 sets the pieces of document image data and their respective pieces of metadata in the expense information management unit 442 of the expense reimbursement system 130. In response to receiving the pieces of metadata, the expense reimbursement system request unit 433 returns information indicating that the setting has been completed to the cooperative service request unit 423 of the MFP 110 through the request control unit 431.

A description has been given above of a method in which, in a case where a plurality of documents are scanned simultaneously, metadata contained in each piece of document image data is compared with the others and, if related pieces of data are present, these pieces of document image data are displayed side by side on a user interface and the user determines whether they are related to the same transaction. In this way, the user can easily prevent pieces of information related to the same transaction from redundantly registered in a system.

Note that in the embodiment, the configuration is such that the MFP cooperative service 120 performs the multi-cropping process and the image analysis processes such as the metadata extraction, and the MFP 110 performs the processes related to the related-data determination and the identical-data determination. However, the present disclosure is not limited to this configuration. For example, the MFP 110 may perform the multi-cropping process and the image analysis processes, and the MFP cooperative service 120 may perform the related-data determination and the identical-data determination.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

According to the present disclosure, in a case where a plurality of documents are scanned simultaneously, documents related to the same transaction can be prevented from redundantly registered.

This application claims the benefit of Japanese Patent Application No. 2019-234350 filed Dec. 25, 2019, which is hereby incorporated by reference wherein in its entirety.

What is claimed is:

1. An information processing apparatus comprising:
   a memory that stores an instruction; and
   a processor that executes the instruction to perform:
   obtaining a plurality of document images by scanning a plurality of documents;
   displaying two or more document images included in the plurality of document images, wherein the two or more document images are related images that have one or more same character strings obtained by performing OCR (Optical Character Recognition) processing for the plurality of document images; and
   causing a user to select whether the displayed two or more document images are to be associated with each other and handled as a single piece of document image data or at least one of the two or more document images is to be deleted.

2. The information processing apparatus according to claim 1, wherein the one or more same character strings are at least on a date and an amount of money.

3. The information processing apparatus according to claim 1, wherein the two or more document images differ from each other in document type, but are assumed to be related to a same transaction based on the character strings obtained by performing OCR processing.

4. The information processing apparatus according to claim 1, wherein the two or more document images associated with each other and handled as the single piece of document image data has a single piece of metadata common to the two or more document images.

5. The information processing apparatus according to claim 1, wherein the processor further performs:
   displaying one of the plurality of document images of two or more document images; and
   controlling to set, based on a user input, a piece of metadata of the one of the plurality of document images.

6. The information processing apparatus according to claim 1,
   wherein the information processing apparatus is capable of communicating with a storage server storing, together with pieces of metadata, a plurality of document images obtained previously by scanning a plurality of documents; and
   wherein the processor further performs:
   in a case where a document image that has a same piece of metadata as a document image stored in the storage server is further identified among the plurality of document images being subject to the OCR processing, displaying the identified document image; and
   causing a user to select whether the displayed document image is to be deleted or not.

7. The information processing apparatus according to claim 6, wherein the same piece of metadata includes information on a date, an amount of money and an image feature.

8. The information processing apparatus according to claim 6, wherein a selection whether the displayed document image having the same piece of metadata is to be deleted or not is performed by a user after a selection following a display of the two or more document images.

9. The information processing apparatus according to claim 1, wherein the plurality of document images are obtained by performing a multi-cropping process for a scanned image obtained by scanning the plurality of documents.

10. An information processing method comprising:
    obtaining a plurality of document images by scanning a plurality of documents;
    displaying two or more document images included in the plurality of document images, wherein the two or more document images are related images that have one or more same character strings obtained by performing OCR (Optical Character Recognition) processing for the plurality of document images; and
    causing a user to select whether the displayed two or more document images are to be associated with each other and handled as a single piece of document image data or at least one of the two or more document images is to be deleted.

11. A non-transitory computer readable storage medium storing a program that causes a computer to execute an information processing method comprising:
    obtaining a plurality of document images by scanning a plurality of documents;
    displaying two or more document images included in the plurality of document images, wherein the two or more document images are related images that have one or more same character strings obtained by performing OCR (Optical Character Recognition) processing for the plurality of document images; and
    causing a user to select whether the displayed two or more document images are to be associated with each other and handled as a single piece of document image data or at least one of the two or more document images is to be deleted.

* * * * *